United States Patent [19]
Julien

[11] Patent Number: 4,976,064
[45] Date of Patent: Dec. 11, 1990

[54] EQUIPMENT AND METHODS FOR INJECTING AQUEOUS NUTRIENT SOLUTION IN HYDROPONIC CULTURE

[76] Inventor: Philippe Julien, 323, Avenue Moliére, Brussels B-1060, Belgium

[21] Appl. No.: 343,177

[22] PCT Filed: May 18, 1988

[86] PCT No.: PCT/BE88/00017
§ 371 Date: Feb. 27, 1989
§ 102(e) Date: Feb. 27, 1989

[87] PCT Pub. No.: WO88/09116
PCT Pub. Date: Dec. 1, 1988

[30] Foreign Application Priority Data
May 18, 1987 [BE] Belgium .............................. 8700550

[51] Int. Cl.$^5$ .............................................. A01G 31/02
[52] U.S. Cl. ............................................ 47/63; 47/59; 239/545
[58] Field of Search .................... 47/59, 62, 63, 64, 60; 239/543, 545

[56] References Cited

U.S. PATENT DOCUMENTS

| | | | |
|---|---|---|---|
| 3,660,933 | 5/1972 | Wong | 47/62 |
| 4,332,105 | 6/1982 | Nir | 47/62 X |
| 4,514,930 | 5/1985 | Schorr | 47/63 X |

FOREIGN PATENT DOCUMENTS

| | | | |
|---|---|---|---|
| 0010737 | 5/1980 | European Pat. Off. | |
| 0052264 | 5/1982 | European Pat. Off. | 47/62 |
| 0062966 | 10/1982 | European Pat. Off. | 47/59 |

Primary Examiner—Henry E. Raduazo
Assistant Examiner—Jerrold D. Johnson

[57] ABSTRACT

A device for injecting aqueous nutrient solution (2) for hydroponic culture constituted of substantially horizontal supply pipes (9) located in the air space (3), held against the lateral walls (10) of the tank (1), injecting the nutrient solution (2) in the form of droplets through injection orifices (11) on opposed, substantially horizontal trajectories, thus improving their gaseous transfer capacity and their penetration into the nutrient solution to accomplish a continual saturation of this nutrient solution (2) with oxygen.

2 Claims, 1 Drawing Sheet

EQUIPMENT AND METHODS FOR INJECTING AQUEOUS NUTRIENT SOLUTION IN HYDROPONIC CULTURE

BACKGROUND OF THE INVENTION

The present invention relates to a hydroponic installation for growing plants, in which the roots are constantly immersed in an aqueous nutrient solution.

It is known that a plant's capacity for absorbing water depends on the water's degree of saturation with dissolved oxygen, not merely with dissolved air, in the area about its roots.

It is obvious that, unless the plant absorbs water it absorbs no nutrients.

There are, furthermore, periods when the roots need to release gases, such as carbon dioxide ($CO_2$) and ethylene.

Since the aim is to dissolve a gas—oxygen in this case—in water, the method currently most used in aquariums, for example, consists in blowing air into the water, which is a poor method.

This is because each air bubble, which contains 21% oxygen, as in the atmosphere, has but a small surface area through which its oxygen has to be able to diffuse into the volume of water, namely, the water that surrounds the bubble, which is enormous in relation to the volume of the bubble.

However, in the HCI process, which is the subject matter of the invention, this enormous volume of water is broken up into small droplets, each being surrounded by an enormous volume of air in relation to the volume of the droplet. In other words, the physical conditions in this process are completely reversed.

Consequently, since gases seek a state of equilibrium (a fundamental law of physics), oxygen, abundant in air, will easily diffuse through the surface of the water droplets which contain little or no oxygen.

During the growth of the plant, its roots release into the water carbon dioxide ($CO_2$) or ethylene, which causes the concentration of these gases in the droplets to exceed that of the ambient air. Hence, these gases will easily be able to leave the water droplets to diffuse into this ambient air. It is in this that the HCI gas exchange process consists. Of the two saturations, oxygen saturation is by far the most important, because it is more difficult to achieve economically. This difficulty is all the greater when the temperature of the air and of the water is higher, that is, in spring, which is precisely the season when the plants' oxygen demand is greatest, because they are in their full growth activity and are laden with fruits.

It is in such conditions that the other systems prove to be insufficient, resulting in the death of a great number of roots and the deterioration of the plant itself, with the possibility that this devastating sickness may extend to all the other roots.

It is also known that roots gripped in a solid support can be damaged mechanically by the latter, and since the tissue of the plant, hurt by this support or otherwise, is held in place, it can decompose to create a disease that will destroy all of the roots in existing hydroponic systems, both static and circulating.

Two methods will be described for injecting nutrient substances, one of them using laser-drilled holes, the other using individual nozzles, both permitting the delivery of the necessary nutrient solution in the form of fog. The laser method requires a higher distribution pressure and a pump of a larger size for very large installations permitting the development of roots from plant cuttings, but it can also be of inestimable value for the root growth of difficult varieties of plants. The nozzle method requires less pressure but operates with a greater rate of flow, which makes it quite recommendable for plants such as tomatoes which need a long period of growth (up to one year), which results in a substantial increase both in growth and in the destruction of the mass of the roots. The greater flow of the injector system results in the accelerated removal of destroyed root tissues, assuring an environment free of diseased roots.

Various patents have already been filed in this field, including the European Patent Nos.:
0,010,737 of Dec. 1, 1982
0,052,264 of Jan. 2, 1986
both of which relate to a hydroponic apparatus comprising a tank with removable cover containing an aqueous nutrient solution and an air space between the surface of the latter and the cover in which openings are created, each able to receive different devices for holding these plants firmly in a vertical position.

In the first patent, the aeration of the solution is performed by a central device driven, either constantly or intermittently, by an electric motor. This vertical-axis device includes, on the one hand a horizontal disk revolving in the air space, and on the other hand a tube for aspirating the nutrient solution, injecting the latter directly onto the disk whose marginal shape combined with its rotation produces the flow of the nutrient solution into the air space in the form of very small droplets forming a fog.

In the second patent a tubular overflow enabling the level of the nutrient solution to be regulated is connected to a well-known system outside of the tank, including, among other things, a circulation pump, a water supply, a system for regenerating the solution with mineral salts, filters, and a by-pass, the nutrient solution being injected under pressure into the tank through one or more tubular, substantially horizontal ramps, half immersed in the solution, through a series of holes aiming the solution upwardly toward the cover, such that the air space is filled with a fog of nutrient solution descending continually into the solution and constantly being replaced with other amounts of injected solution.

Experience has shown that these two patents did not give the expected results.

The objective of the present invention is to improve the yield of such hydroponic cultures by eliminating all dead plant waste by the rapid elimination of damaged or deformed portions of roots, constituting ideal environments for the development of disease.

SUMMARY OF THE INVENTION

For this purpose a new device for injection of nutrient solution, the object of the invention, has been devised. It permits obtaining droplets as small as possible, having the greatest possible ratio of surface area to volume, which gives them an optimum gas exchange power and a greater capacity for penetration into the solution.

DESCRIPTION OF THE DRAWING

The appended drawing illustrates the invention by way of example only, in which.

DESCRIPTION OF THE PREFERRED EMBODIMENTS

Figure 1:
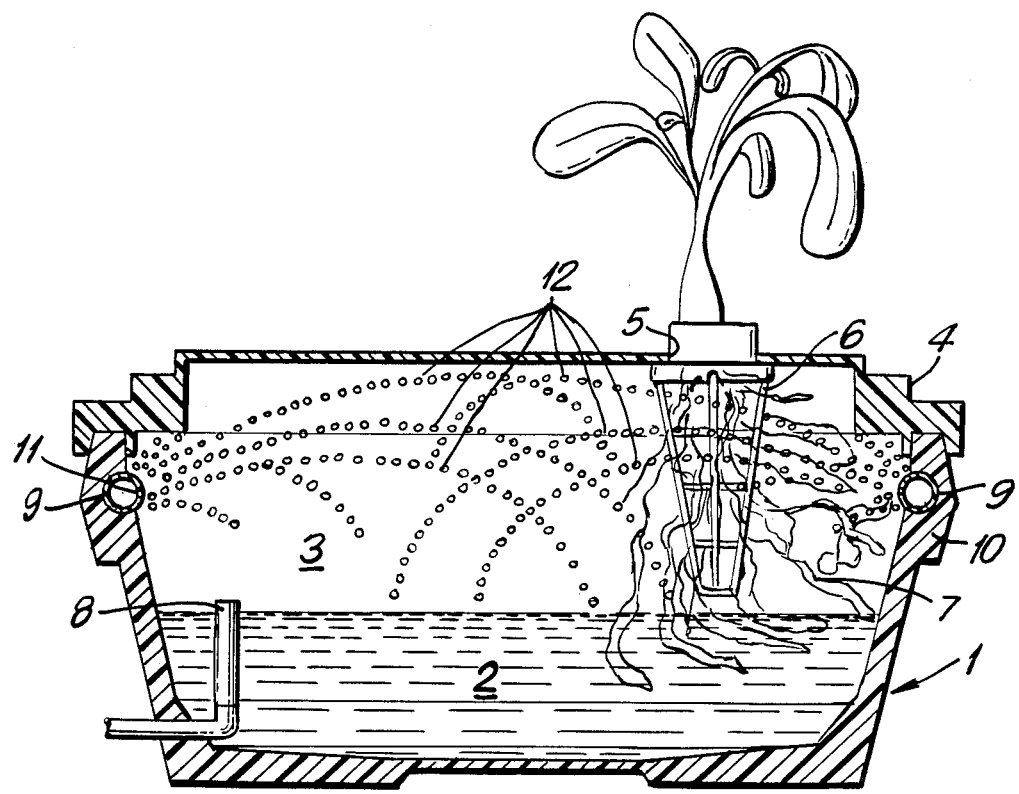
FIG. 1 is a section perpendicular to the longitudinal axis of the apparatus.
Figure 2:
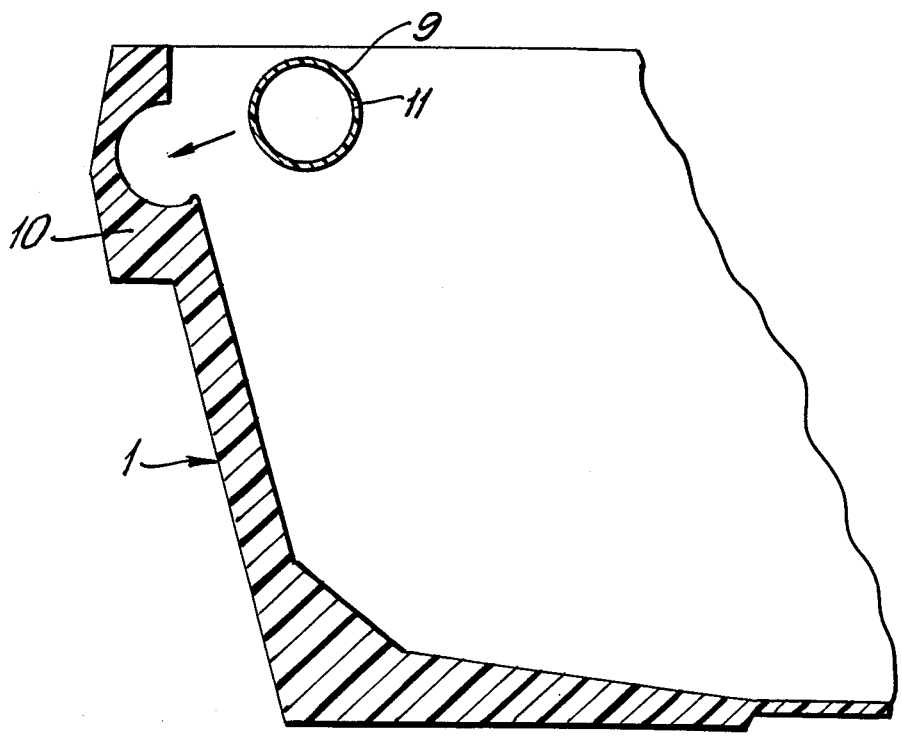
FIG. 2 illustrates a detail of the side wall of the apparatus.

The entire apparatus represented comprises a tank 1 containing the nutrient solution 2 and an air space 3 between the surface of the solution and the removable cover 4 which is provided with openings 5 each containing a plantholder 6 which holds in place the plant whose roots 7 are immersed in the nutrient solution 2. A controllable overflow pipe 8 permits adjusting the level of the solution 2 in the tank 1.

In accordance with the invention, the pipes 9 for feeding nutrient solution 2, which are substantially horizontal, and entirely located in the air space 3 between the surface of the solution 2 and the cover 4 of the tank 1, are lodged in the side walls 10 of the latter where they are held by resilient means of fixation 14 adjacent a cavity 13 of the side wall 10 and provided with injection orifices 11, regularly spaced apart (25 to 50 cm), disposed such that they inject under pressure (2 to 4 bars) by means of a well-known outside system to which the pipes are connected, the exterior system including among other things a circulation pump, the nutrient solution 2 preferably in the form of droplets traveling on opposed, substantially horizontal trajectories 12.

This new injection system makes the droplets collide forcibly with one another so that they break up, increasing their surface-to-volume ratio and their gas exchange capacity as well as their ability to penetrate deeply into the solution, thus decidedly improving their absorption by all of the roots, which is manifested by an increase in the yield of the hydroponic crops accompanied by a reduction in the deterioration of the plant roots and a more rapid removal of dead or deformed tissues in the case of a high-flow installation (with nozzles).

In a first embodiment of the invention, the injection orifices 11 are made by laser perforation so as to obtain the smallest possible diameter. The pressure at which the nutrient solution is distributed must in this case be very high to obtain a favorable result.

In a second embodiment of the invention the injection orifices 11 are provided with individual nozzles, which requires less pressure, but a higher rate of flow and renders the installation particularly desirable for certain types of plants that need a long growth period.

Of course, various modifications can be made by the man of the art to the device that has just been described only by way of nonlimitative example without departing from the scope of the invention.

I claim:

1. Hydroponic growing apparatus comprising: a tank adapted to contain an aqueous nutrient solution, a removable cover, an air space between the solution and the cover, plant holders located in openings in the cover, and means for circulating the solution through the apparatus, said means including a circulation pump, means for injecting the nutrient solution into the tank including pipes entirely located in the air space between the solution and the cover, held on lateral walls of the tank, and having injection orifices, regularly spaced along the pipes, for injecting the solution under pressure on opposite, substantially horizontal trajectories above the surface of the solution, and an overflow pipe for regulating the level of the solution within the tank and for removing excess solution to said external system, and resilient means for retaining the pipes to the lateral walls.

2. A process for injecting an aqueous nutrient solution into a hydroponic growing apparatus having a tank and a cover above the tank comprising the step of injecting droplets of the solution from oppositely located pipes resiliently retained in the tank below the cover and above a level of solution in the tank, through openings in the pipes on substantially horizontal trajectories so as to cause collision and fragmentation of the droplets to thereby increase the surface-to-volume ratio of the droplets, gaseous transfer and penetration of the droplets into the nutrient solution, and continual oxygen saturation of the solution.

* * * * *